Dec. 26, 1967  A. L. JAMES  3,360,412
PROCESS AND SYSTEM FOR PRODUCING HEAT SEALED LAMINATES
Filed June 29, 1964  3 Sheets-Sheet 2

INVENTOR
ALBERT L. JAMES
BY Williamson & Palmatier
ATTORNEYS

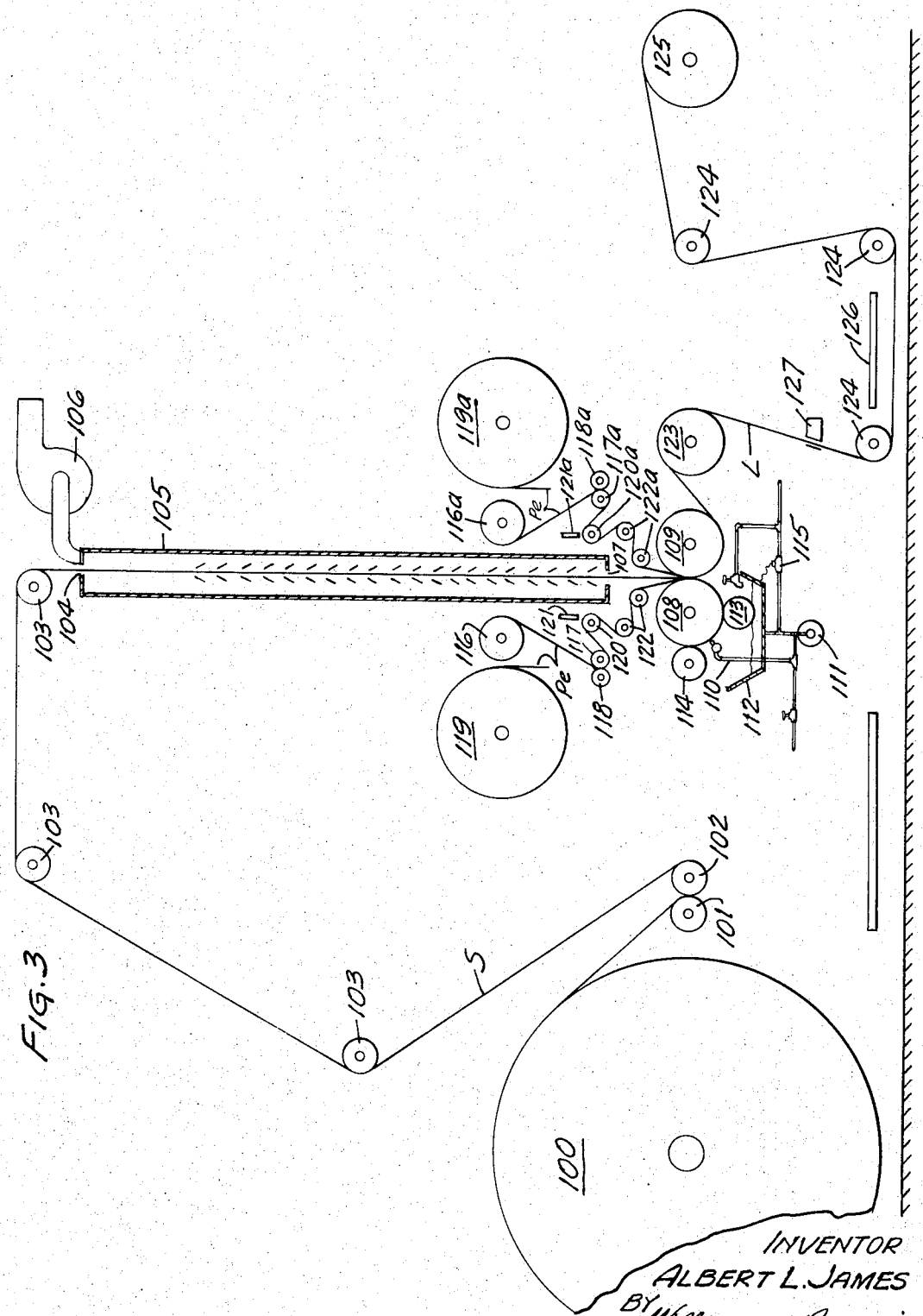

3,360,412
PROCESS AND SYSTEM FOR PRODUCING HEAT SEALED LAMINATES
Albert L. James, Anoka, Minn., assignor of forty percent to Wm. C. Heller, Jr., Milwaukee, Wis.
Filed June 29, 1964, Ser. No. 378,491
6 Claims. (Cl. 156—229)

ABSTRACT OF THE DISCLOSURE

A process and apparatus for producing a heat seal lamination from a film of polyolefin material, such as polyethylene, and a substrate web formed from a material dissimilar from the polyolefin film. Exposing one surface of the polyolefin film to an electrical corona discharge or an oxidizing gas flame to render the exposed surface polar, so that the surface is capable of chemical bonding with a dissimilar material through heat sealing. Heating the substrate web to a temperature at least approximating the heat sealing temperature of the treated surface of the polyolefin film and then bringing the polyolefin film into firm contact with the heated substrate web by providing means for compressing the web and film together, so that the web and substrate adhere to each other. The heat seal laminated structure which is formed by this process and through the use of this apparatus.

---

This invention relates to a method and system for producing a novel heat sealed lamination from a thermoplastic web and substrate webs.

Because of the many desirable physical and chemical properties of the thermoplastics such is polyolefins and the like, these thermoplastic materials are extremely valuable in the coating of other materials to produce a laminate which is impervious to water, water vapor, heat and is generally inert to most chemicals. Laminations of thermoplastics with other materials including paper, paperboard, foils and other plastics is of increasing interest and value in the packaging industry and specifically in the food packaging field. For example, for packaged articles such as milk, frozen food and butter, cartons are now coated or laminated with thermoplastic materials since these thermoplastic materials generally do not produce any deleterious chemical or physical effect with respect to the food stuff with which they come in contact.

Welding or uniting thermoplastic materials with other similar or dissimilar materials is usually accomplished by cementing the materials together through the use of an intermediate bonding agent and in some instances thereafter applying pressure and in some instances heat sufficient to activate the adhesive but not high enough to melt and heat seal the materials joined together. However, certain types of thermoplastic materials are non-adherent to adhesives as well as other substrate materials thereby preventing bonding of such materials together.

Apparatus and processes have been evolved for coating or laminating thermoplastic materials with other materials even though the thermoplastic materials would not ordinarily adhere to the substrate materials. One such process comprises an extrusion coating method wherein a thermoplastic material such as polyolefin is extruded at an extremely high temperature upon a substrate such as paper and the like. During this extrusion operation the extremely hot molten polyolefin is exposed to the air which together with the extremely high temperature apparently oxidizes the surface of the molten polyolefin and permits the polyolefin to bond to the substrate material.

While producing an effective laminated product, this extrusion process has certain disadvantages especially from an economic standpoint. For example, the larger extrusion coaters require a substantial time to heat up to operational temperatures as well as an extended period of corresponding length to allow them to cool down. Thus during the heating up and cooling down stage of these extrusion coaters, a substantial quantity of the polyolefin is actually lost, as well as labor and machine time. Another undesirable feature in the extrusion coating process is that the lamination or coated product produced must have the longitudinal edges thereof trimmed since a bead is formed along these edges during the coating operation. In trimming, it is also necessary to trim a small amount of the substrate with the bead and this trim cannot be reclaimed either as substrate or polyolefin since these materials are adhered to each other. Further, another cause of waste with respect to the extrusion coating process is the waste experienced while "getting gauge" during the initial operational phases of this process. It has been found that even after the extruders have been heated up to operational temperatures, considerable time is involved before the operator is able to "get gauge." It will be appreciated that every width change, every screw speed change, every change of type of polyolefin requires the operator to "get gauge" before the apparatus is capable of a production run.

An additional disadvantage of the extrusion coating process is the waste experienced during the operation of the extruder and generally described as running waste. Thus any malfunctioning or any condition which requires the extrusion coating apparatus to be slowed down, results in unmarketable material since the product produced during the slow down period and the subsequent speed up period to and from operational speeds results in a product which cannot be used.

Even though certain plastics, as pointed out above, may be bonded to others through the use of an intermediate bonding agent, other plastics including some of the thermoplastic materials are relatively non-adherent to adhesives and other materials so that lamination merely through a cementing operation cannot be accomplished. It is pointed out though that methods and means for treating non-adherent surfaces to render them more adherent have been developed. Such processes involve pre-activation of polyethylene by either surface oxidation or electrical discharge. Thereafter, inks and adhesives may be employed which are then compatible with the treated polyethylene surfaces.

However, the use of adhesives in laminating operations also requires these adhesive materials to be subjected to fairly high temperatures to drive off the volatile substances, which operation quite often results in blistering or bubbles forming and the ultimate undesirable production or non-uniform laminates. Thus the high degree of quality control is ordinarily not possible in the laminating operations wherein an intermediate bonding agent is utilized. Further, the use of chemical adhesives involves not only expensive equipment but rather time consuming procedures.

A general object of this invention is to provide a novel method and system for producing a heat sealed laminate from a thermoplastic web and a substrate web.

Another object of this invention is to provide a continuous process and system for producing a heat sealed multi-ply lamination from an unsupported plastic film and substrate webs formed of materials dissimilar from the thermoplastic film.

A more specific object of this invention is to provide a continuous, highly efficient, economical system and process for producing a heat sealed lamination from an unsupported thermoplastic film and a substrate web in which the substrate web is heated to a temperature at least equal to the fusion temperature of the thermoplastic film while maintaining the unsupported plastic film at an unheated temperature so that the latter will remain dimensionally stable, then bringing the heated substrate web and unheated film together applying pressure to heat seal and laminate the film and substrate web.

A further object of this invention is the provision of a high capacity continuous process and system for heat sealed lamination of a plurality of sheets, one of which is comprised of polyolefin and the other sheets being comprised of dissimilar materials such as paper, paperboard, foil and the like, and wherein the polyolefin sheet is pre-activated through surface oxidation or electrical discharge and is continuously moved through a predetermined path while maintained in an unheated temperature, while simultaneously moving the other of said sheets through a heating medium to heat the same to a temperature at least equal to the fusion temperature of the polyolefin sheet, and thereafter quickly bringing the sheets together into intimate contact by applying pressure thereto to heat seal and laminate said sheets.

Another specific object of this invention is to provide a unique high capacity process and system for producing a heat sealed lamination from an unsupported thermoplastic film and lightweight substrate webs, the latter being heated to supply the heat for heat sealing with the former, and the thermoplastic film being maintained in an unheated condition until brought into intimate contact with the heated substrate web, and with the provision of increased heating of the lamination as it is moved over a smooth, preferably cylindrical, surface so the thermoplastic film is heated to a semi-fluid condition and re-orientation of the original molecular bi-axial structure takes place with annealing effect thereby minimizing if not eliminating any tendency of the lamination to curl.

A further object of this invention is the provision of a process and system for producing heat sealed laminations of the class described wherein preactivation of the thermoplastic film through gas flame or electrical discharge not only permits the film to be heat sealed with a substrate but also allows printing upon a surface thereof, the unheated condition of the film until heat sealing in the first nip allowing the film to remain dimensionally stable and eliminating printing distortion, and with provision for tensioning the film to eliminate wrinkles therein and also allowng the printed matter thereon to be printed "short" whereby upon tensioning of the film the printed matter thereon will be stretched to the desired size.

It will therefore be seen that the present invention is directed to a high capacity commercial process and system for producing heat sealed laminations and which may be described as a "dry lamination" process and system since no bonding agents or glues are used. The substrate web is heated to a temperature corresponding to at least the fusion temperature of the thermoplastic film and the latter is maintained in an unheated condition so that it remains dimensionally stable until brought into intimate contact at the heat sealing nip with the substrate web, the latter providing the heat for the heat sealing operation. In the event that the thermoplastic film comprises a polyolefin material, the film is preactivated through a gas flame process or an electrical discharge process whereby the non-polar polyolefin surface is rendered polar and is capable of heat sealing with various dissimilar materials. Since the thermoplastic film is maintained in an unheated condition until brought into intimate contact with the heated substrate web at the nip, the film may have suitable printed matter thereon without the danger of distortion of the printing and the printed matter may be printed on "short" and subsequently enlarged to the desired size by tensioning the thermoplastic film which tensioning step also eliminates wrinkles, in the thermoplastic film.

It is also contemplated in some instances, especially when lightweight substrates are used, that the heat sealed lamination product will be subjected to increased temperature while being moved over a uniform, preferably cylindrical, surface to render the thermoplastic material into a semi-fluid condition so that the molecular structure of the thermoplastic material undergoes re-orientation and eliminates curl in the resulting laminate. The apparatus employed in the present process and system is relatively inexpensive as compared with the cost of apparatus employed in the current extrusion coating system which is utilized to commercially produce thermoplastic coated products. Further the present dry lamination process and system has many inherent advantages over the extrusion coating system as well as cementing systems which employ glue or other adhesives. To this end it is pointed out that my dry lamination process and system minimizes operational wastes and also effects a substantial saving in labor, materials and time.

These and other objects and advantages of the invention will more fully appear from the following description made in connection with the accompanying drawings, wherein like character references refer to the same or similar parts throughout the several views, and in which:

FIG. 3 is a further modification wherein a heavier type substrate forms an intermediate laminate with exterior sheets or films of thermoplastic material.

Figure 1:
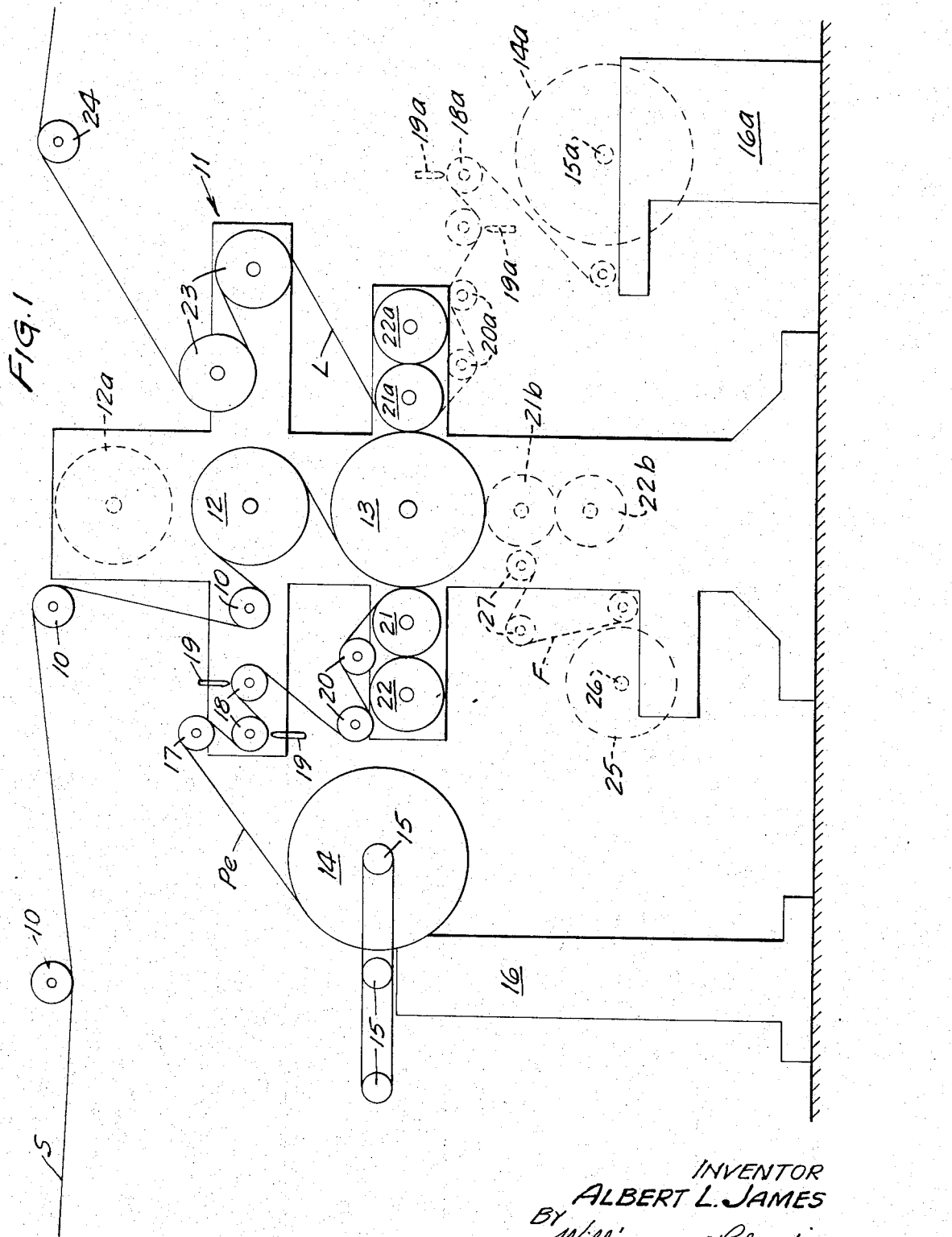
FIG. 1 is a diagrammatic illustration of one novel system for carrying out the steps of the present process wherein the lamination produced is formed by thermoplastic film bonded on opposite sides with a lightweight substrate.

In a broad sense, the present invention contemplates the production of heat sealed laminations from a thermoplastic sheet or film and a substrate web formed of a material different from the thermoplastic film. The thermoplastic film is unsupported in the sense that it is not attached to or does not coat some other web but this film must be maintained in an unheated condition to remain dimensionally stable. Therefore one of the important features of the present invention is that the substrate web is heated and provides the heat necessary to afford heat sealability between the thermoplastic film and substrate web. In practice, the thermoplastic film is maintained in an unheated condition until it is brought into contact with the heated substrate at the heat sealing nip.

Inasmuch as the present process and system does not involve or require the use of adhesives such as glue and the like, this process may be described as a "dry lamination" process. Although it is preferred that the thermoplastic material be a polyolefin film or sheet because of its economic availability, other self-supporting thermoplastic films such as polyvinylidene chloride, vinyl acetate, cellulose acetate, vinyl chloride, vinyl chloride-acetate copolymer, ethyl cellulose, cellulose triacetate, rubber hydrochloride "Pliofilm," polyvinyl alcohol, polystyrene, polyvinyl butyral, polyvinyl acetate and other thermoplastic films and sheets may be used. The particular substrate materials to be employed will be dependent upon the particular use of the laminate which is formed. For example, in the packaging field, the substrate may be formed of kraft paper, paperboard, cellophane, saran coated cellophane, glassine paper, sulphite paper, ground wood sheet, various foils, metal sheets and other packaging material. It is further pointed out that in practicing my invention, the thermoplastic film may be laminated through heat sealing to other thermoplastic materials so that various combinations of thermoplastic materials may actually constitute the lamina of the lamination thus formed. It will be appreciated that the novel heat sealed lamination products which are produced in accordance with my process and system will have a very wide application of usage in addition to utility in the packaging field and which may include industrial usage as both thermal and electrical insulating material household roll material, agricultural coverings, disposable covering etc.

As pointed out above, it is preferred that the thermoplastic material be comprised of polyolefin film because of the commercial and economic availability of this film. However, polyolefin material is normally non-adherent to other materials even though the polyolefin material is fused to such other material. The surface of polyolefin materials is non-polar and is therefore chemically inert with respect to other materials so that polyolefin will not generally laminate with such other materials. Certain processes and systems have been evolved in which polyolefin materials may be pre-activated by treatment of the surfaces thereof through surface oxidation and electrical discharge. When the surface of polyolefin material such as polyethylene film is treated to produce surface oxidation thereof, the surface of such polyethylene body is subjected to an open gas flame, normally to an extent sufficient to melt the surface and then allowing the surface to harden. In addition to the occurrence of surface oxidation it is believed that in this particular treatment, the surface molecules of the polyethylene body are re-oriented, the surface tension broken and myriads of molecule chains are created.

In the electrical discharge process for treating the surface of polyethylene, the surface is exposed to an electrical discharge produced by high voltage electrical current. In some instances, the electron bombardment of the polyethylene surface involves a corona glow or discharge closely adjacent the treated surface. Although the mechanisms and phenomena involved in the electrical discharge treatment process are as present undetermined, it is thought that the electrical treatment increases the number of unsaturated linkages in the polyethylene surface molecules so that the treated surface becomes more adherent.

The terms "treatment" or "treated" as used herein are to be defined as the electrical discharge method or gas flame oxidation method for treating a surface of polyolefin bodies such as polyethylene film and sheets.

In practicing the present process, the thermoplactic film and the substrate web or webs are preferably moved through a predetermined path, the film and substrate web normally being unwound from relatively large source rolls of such material. If the thermoplastic material comprises polyolefin such as polyethylene film this will be first treated either through the electrical discharge method or the gas flame oxidation method. Of course, the rolls of films used may be "pre-treated" when manufactured. In practicing the instant invention, the electrical discharge process is preferred and has been diagrammatically represented in the various embodiments of the system illustrated.

The substrate web is heated, or has at least the surface thereof to be heat sealed, heated to a temperature preferably slightly exceeding the fusion temperature of the thermoplastic film surface. The substrate web and thermoplastic film are brought into intimate contacting relation with each other by passage between nip rolls having sufficient nip pressure to produce heat sealing of the film and substrate. The treated surface of the thermoplastic film when brought into contact with the heated surface of the substrate web will be heated to its fusion temperature so that this treated surface will be in a semi-fluid condition. The nip pressure will be sufficient to press the film and web into such contact with each other so that in the event the substrate web is formed of porous fibrous material such as kraft paper, cloth or the like, the thermoplastic substance will actually flow around the surface fibers of the substrate web down into the interstices and anchor itself mechanically. In addition to this, the treated surface of the polyolefin film will also have a chemical affinity for the dissimilar material substrate substance so that a chemical as well as mechanical bond will be effected. This chemical adhesion is especially necessary when the thermoplastic film is to be dry laminated to a dense non-porous, non-fibrous substance such as glassine paper, cellophane, foil or other such substrate materials. The mechanical adhesion or bonding alone in such instances would be insufficient to laminate the materials together. This, of course, would occur in the event the polyolefin film were untreated.

In the case of rough, porous, fibrous substrates only, in order to further improve the adhesive relationship between the film and substrate web it is desirable to increase the heat of the laminate to a temperature sufficient to heat the thermoplastic film throughout its depth to a temperature corresponding to the fusion temperature of the film and thereafter subjecting the laminate to an additional nip or nips to drive and press the fused thermoplastic film into the interstices and around the fibers of the substrate to additionally increase the mechanical bond and also to greatly increase the area of the chemical bond.

This multiple nip feature as well as the subsequent heating of the polyolefin film after being brought into contact with the substrate web not only greatly increases the chemical and mechanical bond of the lamina but also is desirable for eliminating any tendency of the laminated product to curl when lightweight substrates are utilized. In the manufacture of thermoplastic film, this film is extruded in a molten condition from a die and while still in a semi-viscous state, it is "drawn" to gauge and dimensions. This drawing process stretches the random "coil spring like" molecular chains so that when the film is cooled to a solid state, the film has stretches and strains frozen into them. Thereafter when the film is reheated to a similar viscous fluid state a force will be exerted by the molecular bi-axial orientation of the molecular chains so that the fluid film will tend to contract. In my dry lamination process and system, the thermoplastic film is already secured to a substrate web when it is heated to a semi-viscous fluid state so that if a lightweight substrate is utilized, contraction of the thermoplastic film will tend to curl the lamination.

However, by increasing the temperature of the laminate while holding the laminate against a smooth, preferably cylindrical surface, no contraction can take place with respect to the film and if the film is allowed to remain or dwell in the semi-fluid condition for a predetermined period of time, molecular re-orientation takes place. Thereafter when the thermoplastic film of the laminate is cooled to a solid state, there will be no tendency of the laminate to curl.

This is accomplished in the instant invention by holding the laminate against the surface of a heated drum after heat sealing at the first nip as the lamination travels around such a drum to subsequent nips. When sufficient tension is applied to the laminate, the latter lies flat against the heated drum surface and this heating together with the multiple nip feature not only produces the desired heat seal between the film and substrate but an annealing effect takes place with respect to the thermoplastic film and molecular re-orientation occurs so that no curl will be produced upon subsequent cooling of the laminate.

It is pointed out that the above steps have been directed to the heat sealed lamination of a single substrate and single polyethylene film. The present process and system also contemplates a preferably continuous operation wherein both surfaces of a thermoplastic film are treated so that multi-ply laminations may be formed. Thus typical of such multi-ply laminations may include a product having a substrate of paper, heat sealed to one surface of a thermoplastic film while the other surface of the thermoplastic film will be heat sealed to a substrate formed of foil or the like.

Referring now to the embodiment illustrated in FIG. 1, it will be seen that an elongate web of substrate material S, such as multi-wall kraft paper or the like, is trained over idler rollers 10 which are arranged in spaced-apart relationship. It is pointed out that although not shown in the drawing, the substrate web S will be unwound from a roll of such material mounted upon an unwind stand of conventional construction provided with suitable braking mechanism and means for effecting flying splices in a well known manner. At least one of the idler rollers 10 is mounted upon a laminating support structure 11 which is of vertical upright construction and is provided with a plurality of horizontally disposed arms.

The shape and design of the laminating support structure 11 is primarily for the purpose of conveniently mounting the various elements of the laminator compactly so that the system may be accommodated in most conventional building structures. To this end, the idler rollers 10 are preferably mounted in spaced relation to the floor of such a building to permit easy reach by an operator but permitting an operator to walk beneath such rollers. It will be noted that one of the idler rollers 10 is mounted upon the laminator support structure in close proximity to a relatively large revolvable pre-heat cylinder 12 which is formed of a pair of concentric spaced-apart steel cylindrical shells, the exterior shell preferably being chrome plated. The pre-heat cylinder may be of the type constructed by the Frank W. Eager Company of Summerville, N.J., and is provided with a spiral baffle mechanism (not shown) between the shells through which is circulated a heated liquid such as glycol or the like which heats the exterior shell to a predetermined temperature. Thus the pre-heat cylinder 12 serves as a heat exchanger and effectively pre-heats the substrate web S as the latter is moved along the surface thereof. An additional pre-heat cylinder 12a (shown in dotted line configuration) may also be provided and which is preferably of identical construction and size to the pre-heat cylinder 12. This additional or auxiliary pre-heat cylinder 12a does not serve to increase the heating capacity for pre-heating the substrate material but may be utilized when the laminator is operated at high speed.

The laminator system also includes a relatively large revolvably mounted heated nip cylinder 13 which is similar in construction to the double shell pre-heating cylinders 12 and 12a but which is of substantially larger size than these pre-heating cylinders. Thus this heated nip cylinder is also of double shell construction having spiral baffle means between the shells thereof for controlling the flow of a heated liquid such as glycol or other suitable heating liquids between shells so that the exterior shell is heated to a predetermined temperature. Thus the heated nip cylinder 13 cooperates with the pre-heat cylinder 12 and in some instances the auxiliary pre-heat cylinder 12a to heat the substrate S to a temperature preferably slightly higher than the fusion temperature of the thermoplastic film which is to be heat sealed with the substrate web. In practice, it has been found that the substrate web should have the surface thereof heated to a temperature within the range of approximately 250° F. to 400° F. for effecting the heat sealing action with most thermoplastic films.

The thermoplastic material illustrated in FIG. 1 comprises a polyethylene film PE which is unwound from a roll 14 of such material revolvably at one of a plurality of shafts 15 carried by a turret type rewind stand 16. The additional shafts 15 of the turret type rewind stand 16 will accommodate additional rolls of polyethylene or other thermoplastic materials and provision will be made to permit a flying splice to be made during operation of the system. It will be seen that the polyethylene film is trained over an idler roller 17 carried by the laminator support structure 11, the idler roller preferably being constructed of sand blasted aluminum to provide a traction surface. The polyethylene film is thereafter trained over a pair of driven treater rolls 18 which are revolved at a predetermined speed so as to maintain a constant tension on the polyethylene and which also serve to draw the film stock from the roll 14. The treater rolls 18 are preferably covered with a dielectric plastic material sold under the trade name "Hypolon" and which is used in conjunction with the electrical discharge process for treating polyolefin film surfaces.

It will be noted than an electrode mechanism 19 is positioned slightly below and in close proximity to the first treater roll 18 and that another electrode mechanism 19 is positioned above and in close proximity to the second treater roll 18. These electrode mechanisms 19 are supplied with high voltage high frequency current through suitable electrical conductors (not shown) and serve to subject the opposed surfaces of the polyolefin film to electron bombardment to increase the adherent properties thereof. As pointed out above, this electrical discharge process is well known in the art and a detailed description of the electrical discharge process as well as the gas flame oxidation process is felt unnecessary for the present application.

The treated polyethylene film is thereafter trained around a pair of spreader rolls 20 also preferably constructed of aluminum material and having a herringbone exterior surface, these spreader rolls serving to maintain the film in wrinkle free condition as it is fed to the heat sealing nip.

The treated polyolefin film PE is thereafter fed into the heat sealing nip defined by the heated nip cylinder 13 and the silicone rubber covered nip roll 21 also journaled on the laminator support structure 11. The silicone rubber of the nip roll 21 has a non-adhesive or release effect with respect to the unheated polyethylene film as the latter is fed into the nip but this nip roll 21 will tend to become heated by the heat generated from the heated nip cylinder 13. Therefore a back-up cooling cylinder 22 is provided which is of double shell construction similar to the preheat cylinders 12 and the heated nip cylinder 13, and which is provided with a spiral baffle between the shells thereof for controlling the flow of the cold water introduced into the volumetric space between the shells thereof. It is pointed out that it is necessary to keep the nip roll 21 in an unheated condition since the polyethylene film will get so hot upon contact with such a heated roll, it would melt, stretch and in some instances pull apart. Therefore the nip roll 21 is cooled by its coaction with the back-up cooling cylinder 22, and the polyethylene film is maintained in an unheated condition until it engages the heated substrate web as it is fed into the nip.

The nip pressure between the heated nip cylinder 13 and the nip roll 21 should be approximately 70 lbs. per linear inch of nip and this nip pressure should be applied by use of pneumatic piston and cylinder units (not shown) since the air forms a yieldable cushion that is responsive to pressures caused by uneven thickness of the material which results from wrinkles, wraps etc. Therefore since the nip is subjected to non-uniform pressures, not only should the heated nip cylinder 13 have the nip pressure applied by suitable pneumatic piston and cylinder units but the back-up cooling cylinder 22 should also have pressure applied thereto by pneumatic cylinder and piston units. With this particular arrangement, the nip roll 21 is in effect allowed to float in its relative position betweent he back-up cooling cylinder 22 and the heated nip cylinder 13.

The laminator is also provided with a second nip which in the embodiment shown is diametrically opposed to the first nip and this second nip is defined by the heated nip cylinder 13 and a second nip roll 21a. The second nip roll 21a is identical in construction to the nip roll 21 and is of silicone rubber construction and is cooled by a back-up cooling cylinder 22a identical in construction to the cooling cylinder 22. This second nip is essential in the manufacture of multi-wall liner paper used in the packaging industry, and in the coating of all rough surface substrate webs at high speeds for the following reasons. The second nip defined by the nip roll 21a and the heated nip cylinder 13 will provide the surface of the thermoplastic film with a matte finish so that the lamination will have sufficient slip to ride over the former in multi-wall operations as well as obviating blocking in the interior of the bags during formation thereof. This second nip also drives the soft hot polyethylene into the interstices of the porous, rough surface of substrate webs which improves the adhesion over that provided by a single nip.

The laminate L formed through the heat sealed lamination of the substrate web and thermoplastic film is passed over a plurality of water cooled chilled rolls 23 as this lamination L leaves the last nip. In this regard, it is pointed out that the lamination L will have a temperature of approximately 300° F. as it leaves the last nip and must be cooled before the film side of the laminate can be passed over any idlers and before rewind of the laminate. These water cooled rolls 23 are also of double shell design having provision for a spiral baffle between the shells for controlling and directing the flow of cooled water as water is passed through a volumetric space between the shells.

The lamination L will thereafter be passed over an idler roll 24 to a suitable rewind mechanism where the laminate is wound into roll form.

In the event that it is desirable to form a multi-ply lamination, a roll 25 of some other substrate material such as foil F is suitably mounted upon a shaft 26 mounted on the laminator support structure 11 and is trained over threader rolls 27, the latter having herringbone surface for removing wrinkles from the foil. This foil is thereafter fed to a nip defined by a silicone coated nip roller 21b identical in construction to the silicone coated nip rolls 21 and 21a and provided with a suitable back-up cooling cylinder 22b. This cooling cylinder 22b is also of identical construction to the back-up cooling cylinders 22 and 22a and it is pointed out that the foil F will be fed to the nip in an unheated condition. However, inasmuch as the thermoplastic film is in a semifluid condition as it is passed through the first nip, the foil need not be heated to produce heat sealing with the thermoplastic film. The nip defined by the nip roll 21a and the heated nip cylinder 13 further serves to increase the mechanical and chemical bond between the thermoplastic film and foil when the latter constitutes one of a number of multi-ply laminations.

In the event that it is desirable to produce a heat sealed laminate having at least two lamina formed of polyethylene film, a second roll 14a of such polyethylene film is revolvably mounted upon a shaft 15a carried by a turret type rewind stand 16a similar to the turret type rewind stand 16. This turret type rewind stand 16a may also be provided with a plurality of empty spools for accommodating additional rolls and having provision for permitting a flying splice to be made during operation of the laminating system. The polyethylene film is trained about a pair of treater rolls 18a similar in construction to the treater rolls 18 and each of which is covered with the dielectric plastic material sold under the trade name "Hypolon." These treater rolls 18a are also provided with suitable drive means to revolve the same at a predetermined speed so that the film stock is unwound from the roll 14a and also to tension the polyethylene film at a predetermined tension. Each treater roll 18a has associated therewith an electrode mechanism 19a connected by suitable electrical conductors with a source of high voltage, high frequency current. Thus the polyethylene film PE which is unwound from roll 14a is treated upon both surfaces thereof by the electrical discharge process to render these surfaces more adherent.

Thereafter the treated polyethylene film is trained over the herringbone aluminum spreader rolls 20a to eliminate any wrinkles from the film prior to its being fed into the nip defined by the nip roll 21a and the heated nip cylinder 13. This treated polyethylene film will be heat sealed to one surface of the foil F when a foil lamina is employed, the interfacial surface of the foil being heated as a result of its nip contact with the first polyethylene film and by the heated nip cylinder 13. It will therefore be seen that the embodiment illustrated in FIG. 1 is capable of producing a heat sealed lamination from a single film of thermoplastic material and a substrate web or alternatively may produce a multi-ply lamination.

Figure 2:
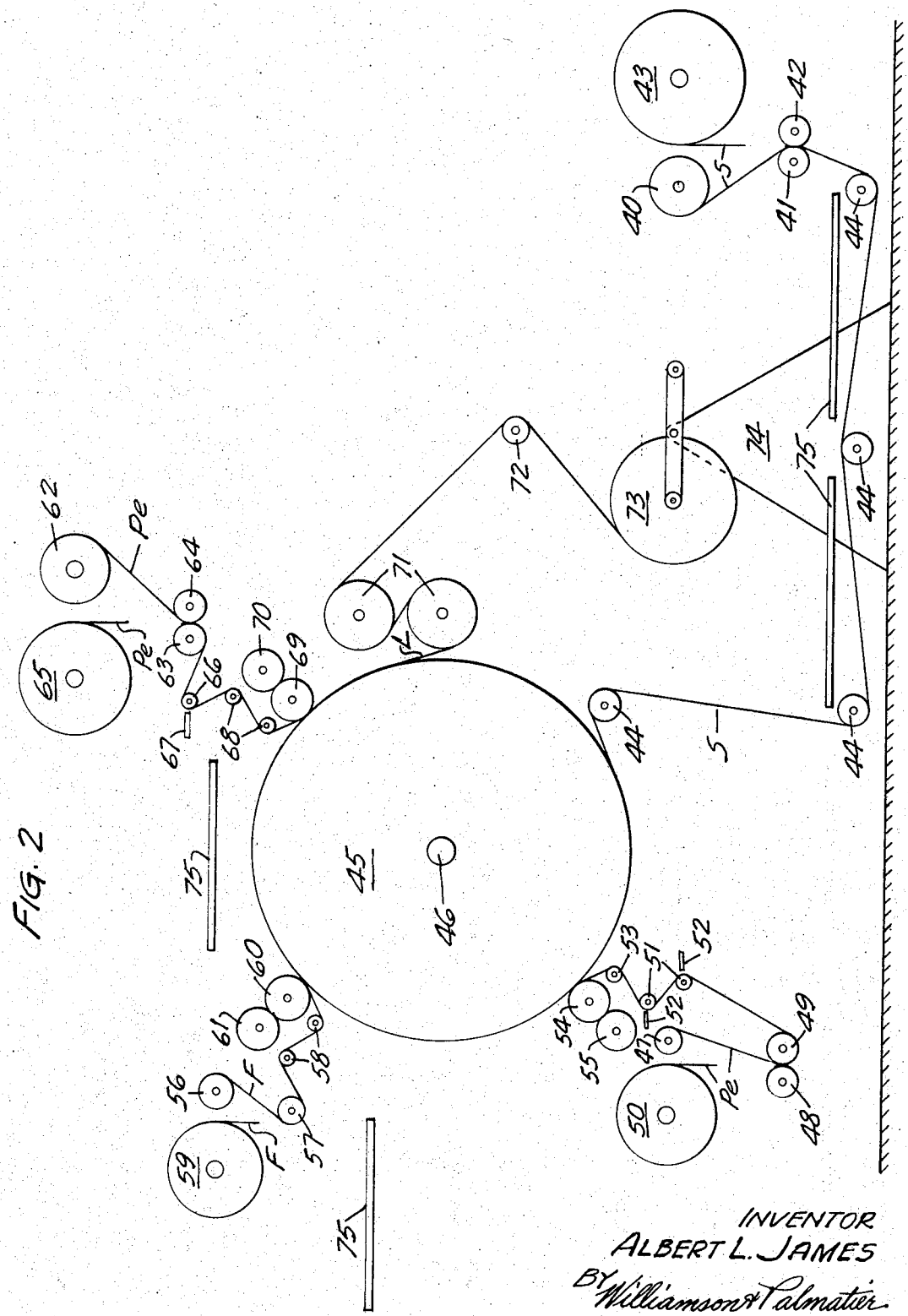
FIG. 2 is a diagrammatic illustration of a modified system wherein a multi-ply lamination is produced.

Referring now to FIG. 2 it will be seen that a slightly modified diagrammatic system for producing a multi-ply lamination of the type similar to the multi-ply products produced by the extrusion coating system is thereshown. Thus the system in FIG. 2 includes a roll 40 of a suitable substrate web S, such as pouch paper or the like, and which is extensively used in the packaging field. This substrate web S is passed through a tensioning device comprised of a fixed roll 41 preferably constructed of a suitable metallic material such as steel, aluminum or the like, and a spring loaded pivotally mounted soft rubber roll 42. This spring loaded pivoted roll 42 not only serves to tension the web S but also serves to draw the web from the roll 40.

This pivoted spring loaded roll 42 may be swung away or released from pressure engaging relation with the fixed roll 41 by a cam or lever type release mechanism, the rolls 40 and 41 applying a nip pressure sufficient to allow a flying splice to be made while the apparatus is operating. To this end, a stand-by roll 43 of the substrate web S is mounted in close proximity to the roll 40 and also in close proximity to the fixed and pivoted rollers 41 and 42 respectively.

After the substrate web S has passed the tension device it is thereafter trained about a plurality of aluminum idler rollers 44, one of which is disposed in close proximity to a relatively large heating drum 45 which is equipped with a suitable circular pump for supplying heat transfer fluid such as glycol or the like whereby the surface of the heating drum is heated to a temperature whithin the range of 130° F. to 300° F. This heating drum 45 is provided with a suitable shaft 46 journaled for rotation and drive by suitable drive means so that the drum is revolved at a predetermined speed in a clockwise direction as viewed in FIG. 2. Thus the substrate web S of the pouch paper is heated as it is moved along the surface of the drum towards the first nip.

A roll 47 of thermoplastic material, which in the embodiment shown comprises a roll of one-half mil polyethylene film PE, is mounted at a suitable location and the polyethylene film PE is passed through a tensioning device comprised of a fixed metallic position roll 48 and a pivotally mounted springs loaded soft rubber roll 49 which are substantially identical in construction to the fixed and pivoted rolls 41 and 42. A stand-by roll 50 of one half mil polyethylene film PE is also mounted in close proximity to the fixed and pivoted rolls 48 and 49 whereby a flying splice may be made as the roll 47 is exhausted.

The polyethylene film is thereafter trained about a pair of treater rolls 51 which are suitably covered with a dielectric plastic material sold under the trade name "Mylar," the rolls 51 being idler rolls and each having associated therewith an electrode mechanism 52 connected by suitable conductors to a source of high voltage, high frequency current whereby opposite sides of the polyethylene film PE is treated.

This treated polyethylene film is thereafter trained about a herringbone spreader roll 53 which serves to flatten and eliminate the wrinkles from the polyethylene film as it is fed to the nip. The first nip is defined by the heating drum 45 and a nip roll 54 preferably constructed of silicone rubber and engaging a back-up cooling cylinder 55 of double shell construction and provided with a spiral baffle between the shells thereof and through which a coolant such as water is directed in the manner of the cooling cylinders of the embodiment of FIG. 1. It is also pointed out that the nip roll 54 and the back-up cooling cylinder 55 are each provided with a pneumatic piston and cylinder unit so that the nip pressure applied is within the range of 50–80 lbs. per inch width against the heating drum 45.

Thus it will be seen that the polyethylene film PE is maintained in an unheated condition until the polyethylene is brought into intimate contact with the substrate web S of pouch paper at the nip. This substrate web S of the pouch paper has been pre-heated to a temperature preferably slightly exceeding the fusion temperature of the polyethylene film and the heat thereof is transferred to the polyethylene film at the nip to effect a mechanical and chemical heat sealed bond thereat. Continued movement of the lamination about the surface of the heating drum 45 causes the polyethylene film to be rendered into a semi-fluid condition for a sufficient period of time to cause re-orientation of the film and thereby eliminate any tendency of the laminate to curl.

A roll 56 of .00035 aluminum foil F is trained about an idler roller 57 and thereafter about a pair of spaced-apart herringbone type spreader rolls 58 before it is fed into the nip for lamination with the polyethylene film. A suitable standby roll 59 of the aluminum foil F is also provided to permit continuous operation of the laminating system without interruption when the roll 56 is exhausted. It will be seen that the foil F remains unheated until it is fed to the nip defined by the heating drum 45 and the silicone rubber nip roll 60. The nip roll 60 is cooled by a suitable back-up cooling cylinder 61 which is identical in construction to the back-up cooling cylinder 55 associated with the nip roll 54. Since the polyethylene film PE which has been previously laminated to the substrate web S of pouch paper is in a semi-fluid condition, the foil F will become heat sealed with this polyethylene film as the foil is brought into intimate contacting relation with the film at the nip. Thereafter the lamination that is formed including the substrate web S of pouch paper, the one half mil polyethylene film PE and the foil F are moved along the surface of the heating drum 45 in a clockwise direction and this lamination will therefore continue to be heated.

The laminate product produced in the system illustrated in FIG. 2 is also provided with a one mil polyethylene coating on the foil side thereof. To this end, it will be seen that a roll 62 of one mil polyethylene film PE is provided and the film is passed through a tensioning device comprised of a fixed metallic position roll 63 and a pivotally mounted spring loaded soft rubber roll 64, which are similar to the other tensioning devices. A stand-by roll 65 of the polyethylene film is also provided to permit continuous operation of the lamination system when the roll 62 is exhausted.

The polyethylene film is trained about a "Mylar" covered treating roll 66 which has an electrode mechanism 67 disposed in close proximity thereto for treating one surface of the polyethylene film with a high voltage, high frequency electrical current. This electrode mechanism 67 is connected by a suitable conductor to a high voltage, high frequency electrical current and the surface of the polyethylene film treated will be rendered more adherent with the heat sealing operation. The polyethylene film is thereafter trained about a pair of herringbone type spreader rolls 68 which not only tension the polyethylene film but remove wrinkles therefrom.

Thereafter the polyethylene film is fed to the nip defined by the heating drum 45 and a silicone rubber nip roll 69. This silicone rubber nip roll 69 is in rolling contact with the back-up cooling cylinder 70 similar in construction to the back-up cooling cylinders 55 and 61 and which serves to cool the nip roll 69. Thus it will be seen that the treated surface of the polyethylene film is brought into intimate contact with the heated foil at the nip to effect a mechanical and chemical heat sealing bond therewith. It will also be noted that the polyethylene film is maintained in an unheated condition until the moment of contacting relation with the foil F. The nip roll 69 and the back-up cooling cylinder 70 are each provided with suitable pneumatic piston and cylinder units normally urging these rolls towards the heating drum 45 so that the nip pressure produced will also be within the range of 50–80 lbs. per inch of web width against the heating drum.

It will be seen that the laminate L will be moved in a clockwise direction over the heated surface of the heating drum 45 for a predetermined period of time and will thereafter be trained about a pair of water cooled chill rolls which are similar in construction to the chill rolls 23 of the embodiment of FIG. 1. The laminate L is cooled by the chill rolls and thereafter trained around an idler roll 72 and finally wound upon a rewind spool to form a roll 73 which is suitably carried by a turret type rewind stand 74. In order to facilitate operation of the system illustrated in FIG. 2 and since the rolls of thermoplastic film and substrate web materials are located at positions spaced from the floor of the building in which the system is incorporated, operator platforms 75 are provided at suitably located positions.

Referring now to FIG. 3 it will be seen that a further modified system for practicing the dry lamination process is thereshown, and this system is especially adaptable for use in coating opposite sides of relatively heavy substrate material such as paperboard stock used in the production of milk cartons and the like. The substrate web S comprises raw uncoated board stock which is unwound from a relatively large roll 100 of such material suitably mounted upon an unwind device of conventional construction. This substrate web is passed through a tension device comprised of two rubber nip rolls, 101 and 102, which are provided with drive means for revolving these rolls and which also may be provided with heavy duty cooled brake means. It is pointed out that a fairly constant and relatively high tension should be maintained between the nip defined by these nip rolls to prevent weaving of the substrate web S as it is passed through the gas fired oven.

The substrate web S is thereafter trained about a plurality of idler rolls and are directed to the gas fired over 105. Although not shown, suitable guide means may be provided to minimize or prevent any weaving of the heavy substrate web as it is moved through the laminator. The gas fired oven 105 is provided with an inlet 104 at its upper end and this oven is adapted to heat the surfaces of the substrate web S to a temperature within the range of 250° F. to 350° F. This oven would also serve as a dryer for drying a primer applied to a substrate web if a primer is found to be necessary in the laminating operation. An exhaust blower 106 is connected in communicating relation with the oven 105 and the substrate web S will be discharged through an outlet 107 located at the lower end of the vertically disposed oven.

The laminator is comprised of a nip defined by a rubber covered nip roller 108 which is normally urged into rolling contact with a fixed cooling cylinder 109 by pneumatic piston and cylinder means (not shown). The nip pressure exerted by the nip is preferably within the range of 70–150 lbs. per linear inch of nip. The cooling cylinder 109 is fixed in the sense that it is not shiftable by pneumatic piston and cylinder unit means but is revolvably driven by a variable speed drive and is of double shell construction having a polished chrome exterior surface. It is preferred that water be used as the coolant which is passed between the shells during the heat exchange function of this cooling cylinder.

The nip roll 108 is normally cooled by a back-up roll 113 partially emersed in a coolant such as water but partially fills a receptacle structure 112. A squeegee roller 114 is also disposed in bearing relation with respect to the nip roll 108 and serves to remove excess water from the nip roll during operation of the laminator. The back-up roll and the squeegee roll are both preferably constructed of suitable metallic material and each having a polished chrome surface and each being urged into bearing relation with the nip roll 108 by suitable air piston and cylinder units. Thus the nip defined by the nip roll 108 has respective coaction with the back-up cooling roll 113 and the squeegee roll 114 and may be opened and closed by the pneumatic cylinder and piston units associated therewith.

It is pointed out that both the back-up cooling roll and squeegee roll are driven to eliminate any drag that might be exerted on the nip roll 108 during operation of the laminator.

In some instances, it may be desirable to further cool the nip roll 108 and to this end, a suitable nozzle mechanism 110 is provided for spreading water directly upon the nip roll as it is needed. A suitable electrical temperature control mechanism 115 is provided for controlling the temperature of the water within the receptacle structure 112 so that the water is maintained within a predetermined temperature range.

The cooling cylinder 109 which together with the nip roll 108 defines the nip is effective for reducing the temperature of the laminate to a temperature within the range of 80° F. to 200° F. As pointed out above the surface temperature of the substrate web S may be as high as 350° F. as the substrate leaves the oven 105.

The substrate web S is coated on both sides thereof with thermoplastic film material which, as shown, comprises polyethylene. The two polyethylene films PE are simultaneously unwound from a pair of rolls 116 and 116a of polyethylene material by the action of suitable tensioning devices, one of which is comprised of a preferably driven rubber draw roll 117 and a spring loaded tensioning roll 118. The other of these similar tensioning devices also comprises a driven rubber draw roll 117a and a pivoted tensioning roll 118a.

These tensioning devices perform multiple functions which include providing a sufficient nip pressure to permit a flying splice to be made through use of conventional pressure sensitive tape or other adhesives while the apparatus is in operation. In addition, these tensioning devices are designed to provide constant tension on the film regardless of the diameter of the roll being unwound and to this end, a suitable brake mechanism may be provided to permit accurate feed of the film to the laminator.

The tensioning devices are also arranged and constructed to not only tension the film for the purpose of removing wrinkles but cooperate with other elements of the system to cause sufficient stretching of the film so that printing thereon can be stretched to a desired size. In order to accomplish this desired tensioning and stretching of the film as it is fed to the laminator it is preferred that the rolls 117 and 117a of the respective tensioning devices be underdriven with respect to the nip roll 108 and the cooling cylinder 109. Thus the tensioning device rolls which firmly grip the film will be driven at a speed slightly below the substrate web speed to cause the film to be stretched whereby printed matter on the film which is printed "short" or undersize will be stretched to the desired length.

In the instant embodiment, the rolls 116a and 119a have reversed printing thereon, the printed matter being printed "short" so that it may be stretched or tensioned to the desired size. It will be appreciated that it is preferred that the vehicle or resin binder of the ink shall be of the thermoplastic type which will upon coming into contact with the heated substrate web S adhere to it. Such inks may include a high shellac base ink which reacts in this manner.

Means are also provided for permitting automatic control of the tensioning devices so that the tensioning devices operate to tension or stretch the printed film the desired amount. Since only one polyethylene film in the system illustrated in FIG. 3 has printed matter thereon, this control system will therefore control only one tensioning device. To this end, the control system includes an electric eye type control mechanism 127 positioned to scan the laminate L as the laminate leaves the chill rolls. The laminate may be provided with an eye spot thereon which actuates a flasher means in a well known manner, the flash signal being received by the electric eye. The latter is provided with suitable cross hair means so that the spot or flash may be related to a frame of reference.

The eye spots may be spaced at predetermined points along the laminate and if the spot appears, for example, above the cross hairs, the film is being stretched too much, and if the flash or spot appears below the cross hairs, then insufficient tension is being adjusted.

Since the polyethylene film is maintained in a cooled condition, the film not only remains dimensionally stable until it reaches the nip but there is little, if any, tendency of the printed matter becoming distorted.

It has been found that it is of greater economic advantage to use printed thermoplastic film in my dry lamination process and system rather than having the printed matter applied to the substrate and thereafter coating the substrate with film or attempting to print after the laminate has been formed. In the event that polyethylene film or other polyolefin film is used as the coating material, this polyolefin film will necessarily have the surfaces thereof treated by the electrical discharge or gas flame process so that the printing will adhere thereto. It may be desirable that the film be subjected to further surface treatment for the purpose of effecting strong mechanical and chemical bonding with the substrate web. To this end, it will be seen that one of the films of polyethylene is trained over a treater roll 120 while the other film is trained over the substantially identical treater roll 120a. Each of these rolls are idler types and are covered with a dielectric plastic material, preferably polyester film, sold under the trade name "Mylar." These idler treater rolls 120 and 120a are also grounded and each has an electrode mechanism associated therewith. It will be seen that the roll 120 has an electrode mechanism 121 positioned in close proximity thereto while the treater roll 120a has an electrode mechanism 121a disposed in juxtaposed relation thereto. These electrode mechanisms are connected by suitable conductors to a source of high voltage, high frequency current and subject the opposed surfaces of the polyethylene film to an electrical discharge sufficient to increase the adherent properties thereof.

The polyethylene film is therefore maintained in an unheated condition until it is fed into the nip defined by the nip roll 108 and the cooling cylinder 109. The heated substrate causes the polyethylene films to be heated to the fusion temperature whereby the nip pressure is sufficient to produce a highly effective chemical and mechanical bond. However, as the laminate continues to pass over the surface of the cooling cylinder 109, the temperature of the laminate is reduced to a range of approximately 80° F. to 200° F. Thereafter the laminate is trained over a chill roll or cylinder 123 where the temperature is sufficiently reduced to allow the laminate to be trained around a plurality of idler rolls 124. It is pointed out that the chill roll 123 is preferably of double shell construction having spiral means between the shells thereof through which a coolant such as water is passed. The laminate L is finally wound upon a rewind device 125 which may be independently driven or may have drive connections with the laminator. In the event that the rewind device is drivingly connected with the laminator drive, suitable slip clutch means are provided.

In the embodiments of the systems illustrated, the thermoplastic material employed has been a polyolefin and specifically a polyethylene film. It is again pointed out that other thermoplastic heat sealing materials may be used such as saran, polyvinyl chloride acetate copolymer etc. In certain of these thermoplastic film materials, it will be unnecessary to treat the surfaces thereof to effect a mechanical and chemical bond with substrate webs. In other instances the substrate web itself may comprise the thermoplastic material which may be bonded with either polyethylene or some other heat sealing material. For example, if polyethylene film is heat sealed with polyvinylchloride the polyethylene will have the surface thereof treated through either the electrical discharge process or the gas flame process while the substrate web of vinyl will require its surface to be treated with a suitable primer. There are many commercial primers now available which may be used to prime the surface of such plastic substrates to render the same susceptible to heat sealed lamination and these primers may include polyethylene amine, titrinates in solution, etc.

It is also pointed out that in the event that polyethylene film is used, this film may be pre-treated by the electrical discharge or gas flame process thus obviating the need of such treatment apparatus with the laminator. Therefore the present process and system contemplates not only the use of untreated polyolefin film which is treated as a step in the process but also contemplates the use of pre-treating film.

It is also pointed out that if an untreated polyolefin film is used, such film must be of the type which has no slip agent on the surface thereof which is to be treated. It will be appreciated that such a slip agent forms a coating or surface on the polyolefin film and gas flame or electrical discharge treatment ordinarily cannot be accomplished in a continuous high speed operation. If a slip agent is employed, it is preferred that the film be pre-treated through the use of the electrical discharge or gas flame processes, so that treatment during the heat sealing lamination operation is not required.

It will be seen that I have provided a novel process and system for producing heat sealed laminations from a film of thermoplastic material and a substrate web formed of a material dissimilar from the thermoplastic film. It will be noted that the present heat sealing process and system is capable of high capacity, high speed operation and is therefore especially adaptable for commercial usage.

It will further be noted that the instant process and system permits the inclusion of many quality controls thereby permitting the production of a high quality laminated product.

It will further be seen that the instant process and system while being extremely valuable in the packaging field is also capable of producing laminated products having an extremely wide range of usages.

It will, of course, be understood that various changes may be made in the form, details, arrangement and proportions of the various parts without departing from the scope of my invention.

It will further be noted that the instant process and system permits the inclusion of many quality controls thereby permitting the production of a high quality laminated product.

It will further be seen that the instant process and system while being extremely valuable in the packaging field is also capable of producing laminated products having an extremely wide range of usages.

It is also pointed out that the present process and system also contemplates the use of substrate materials which are in sheet form rather than in roll stock form. To this end, it is further pointed out that substrate material used in the packaging field such as paper, paperboard and the like are quite often manufactured in sheet form which are of predetermined size and are of flat configuration. These sheets of material would also be heated to a temperature corresponding to the heat sealing temperature of one surface of the thermoplastic film as in the previously described and illustrated embodiments of my system and process. A thermoplastic film itself would be in roll form and would be heat sealed to the heated substrate sheets with provision for an indexing medium for indexing the operation of the lamination of the thermoplastic film to each sheet.

It will, of course, be understood that various changes may be made in the form, details, arrangement and proportions of the various parts without departing from the scope of my invention.

What is claimed is:

1. The process for producing a heat sealed lamination from a film of polyolefin material and a substrate web formed of a material dissimilar from said polyolefin film, the steps which consist in
    exposing a normally non-polar one surface of said polyolefin film to an electrical discharge to render said surface polar so that said exposed surface is capable of chemical and mechanical bonding with a dissimilar through heat sealing,
    heating at least one surface of said substrate web to a temperature at least approximating the heat sealing temperature of said treated surface of the polyolefin film,
    bringing said treated surface of the polyolefin film into firm contact with the heated surface of the substrate web to cause transfer of heat from said substrate web to an extent to effect adherence of the interfacial surfaces of the film and web and cause with said contact, heat sealing of said film and web in laminated form.

2. The process for producing a heat sealed lamination from a film of polyolefin material and a substrate web formed of a material dissimilar from said polyolefin film, the steps which consist in
    treating one surface of said polyolefin film, which is normally non-polar to render said surface polar so that said treated surface is capable of chemical bonding with a dissimilar material through heat sealing,
    heating at least one surface of said substrate web to a temperature at least approximating the heat sealing temperature of a surface of said thermoplastic film while maintaining said polyolefin film at a temperature substantially below the fusion temperature thereof,
    bringing said polyolefin film into firm contact with said heated surface of the substrate web to cause transfer of heat from said substrate web to an extent to effect adherence of the interfacial surfaces of the film and web and cause with said contact, heat sealing of said film and web in laminated form,
    and thereafter heating the laminate to a temperature at least approximating the fusion temperature of said polyolefin film while holding the laminate against a substantially smooth continuous surface for a period of time sufficient to cause molecular re-orientation in the polyolefin material,
    and thereafter cooling said laminate.

3. In a continuing process for producing a heat sealed lamination from a film of polyolefin material and a substrate web formed of material dissimilar from said polyolefin film, and in which the polyolefin film has one surface thereof treated to render said surface polar so that said surface is capable of chemical and mechanical bonding with a dissimilar material through heat sealing, and also having indicia such as printing affixed to said treated surface, the steps which consist in
    moving said substrate web through a heating zone for heating at least one surface of the substrate web to a temperature at least approximating the heat sealing temperature of said treated surface of the polyolefin film,
    moving said polyolefin film through a predetermined path while maintaining the same in an unheated condition so that the film remains dimensionally stable,
    applying constant and uniform tension to said polyolefin film to stretch the same in a longitudinal direction and contract the film transversely to thereby increase the longitudinal size of the indicia to a predetermined size,
    and then suddenly moving said film and substrate web through a pressure-applying zone so that the heated surface of the substrate web intimately contacts the treated surface of said polyolefin film to effect heat sealing of the interfacial surfaces through heat carried by the substrate web, and thereafter cooling said laminate.

4. In the process for producing a multi-ply heat sealed lamination from a plurality of self-supporting thermoplastic films and a plurality of substrate webs formed of materials dissimilar from said thermoplastic films, the steps which consist in treating one surface of said polyolefin film, which is normally non-polar to render said surface polar so that said treated surface is capable of chemical bonding with a dissimilar material through heat sealing, heating at least one surface of one of said substrate webs to a temperature at least approximating the heat sealing temperature of a surface of one of said thermoplastic films while maintaining said thermoplastic films in unheated condition so that these thermoplastic films remain dimensionally stable, bringing one of the thermoplastic films into firm contact with said heated surface of said one substrate web to cause transfer of heat from said substrate web to an extent to effect heat sealing of the interfacial surface of said film with said web, heating said web and film in laminated form to increase the temperature thereof to a temperature approximating the fusion temperature of said film, bringing said other substrate web into firm contact with said one thermoplastic film while the latter is in at least a partially fluid condition to effect heat sealing of said film and said other web, with said first mentioned web in laminated form, continuing to heat said laminate to a temperature at least approximating the heat sealing temperature of the surface of said other thermoplastic film, and bringing said other thermoplastic film into firm contact with said heated surface of the second mentioned substrate web to cause transfer of heat from the latter to an extent to momentarily effect heat sealing of the interfacial surface of said other thermoplastic film with said second mentioned web to laminate said other film to said second mentioned web.

5. In an apparatus system for producing a heat sealed lamination from a film of polyolefin material and a substrate web formed of a material dissimilar from said polyolefin film, said apparatus system comprising means for moving said polyolefin film through a predetermined path while maintaining the same in an unheated condition so that the polyolefin film remain dimensionally stable, means for treating one surface of said polyolefin film which is normally non-polar to render the surface polar so that the treated surface is capable of chemical and mechanical bonding with a dissimilar material through heat sealing, means for moving a substrate web of material through a predetermined path including a heated rotating mechanism for heating at least one surface of the substrate web to a temperature approximating the heat sealing temperature of the treated surface of the polyolefin film, means for pressing the film against a substrate web on said heated rotating mechanism and including a plurality of spaced-apart revolvable members each of which defines with said rotating mechanism a nip for heat sealing the film and substrate web together in laminate form, means for advancing and cooling said laminate.

6. In an apparatus system for producing a heat sealed lamination from a film of polyolefin material and a substrate web formed of a material dissimilar from said polyolefin film, said apparatus system comprising means for moving a polyolefin film through a predetermined path while maintaining the same in an unheated condition so that the polyolefin film remains dimensionally stable, mechanism for treating one surface of said polyolefin film, which is normally non-polar to render the surface polar so that the treated surface is capable of chemical bonding with a dissimilar material through heat sealing, mechanism for applying constant and uniform tension to the polyolefin film to stretch the same in the direction of travel thereof and to contract the film transversely thereof to thereby increase the longitudinal size of indicia printed on the polyolefin film to a predetermined size, means for moving a substrate web of material through a predetermined path, a heating mechanism for heating a substrate web during movement thereof so that at least one surface of the substrate web is heated to a temperature at least approximating the heat sealing temperature of one surface of the polyolefin film, means defining a plurality of spaced-apart nips for pressing the film against the substrate web to cause transfer of heat from said heated substrate web and to effect heat sealing with the film and in laminated form, means for advancing the laminate thus formed, and means for cooling said laminate.

References Cited

UNITED STATES PATENTS

| | | | |
|---|---|---|---|
| 2,259,347 | 10/1941 | Mallory | 156—164 |
| 2,538,520 | 1/1951 | Holt et al. | 156—82 |
| 2,551,591 | 5/1951 | Foord | 156—306 X |
| 2,769,206 | 11/1956 | Cheney et al. | 101—426 X |
| 2,820,733 | 1/1958 | Sorel | 156—229 X |
| 3,018,189 | 1/1962 | Traver | 156—272 X |
| 3,062,698 | 1/1962 | Aykanian | 156—306 |
| 3,075,868 | 1/1963 | Long | 156—82 |
| 3,081,212 | 3/1963 | Taylor et al. | 156—164 |
| 3,081,214 | 3/1963 | Strome | 156—272 |
| 3,171,539 | 3/1964 | Holbrook | 156—306 X |
| 3,282,833 | 11/1966 | Pfeffer | 204—168 |

EARL M. BERGERT, *Primary Examiner.*

D. J. FRITSCH, J. P. MELOCHE, *Assistant Examiners.*